Nov. 17, 1953     H. N. DURHAM     2,659,164

TESTING AND TRAINING APPARATUS

Filed April 24, 1951

INVENTOR
HOBART N. DURHAM
BY
ATTORNEYS

Patented Nov. 17, 1953

2,659,164

UNITED STATES PATENT OFFICE 2,659,164

TESTING AND TRAINING APPARATUS

Hobart N. Durham, Munsey Park, N. Y.

Application April 24, 1951, Serial No. 222,600

8 Claims. (Cl. 35—11)

The present invention relates to new and useful improvements in apparatus for the testing and training of automobile drivers.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
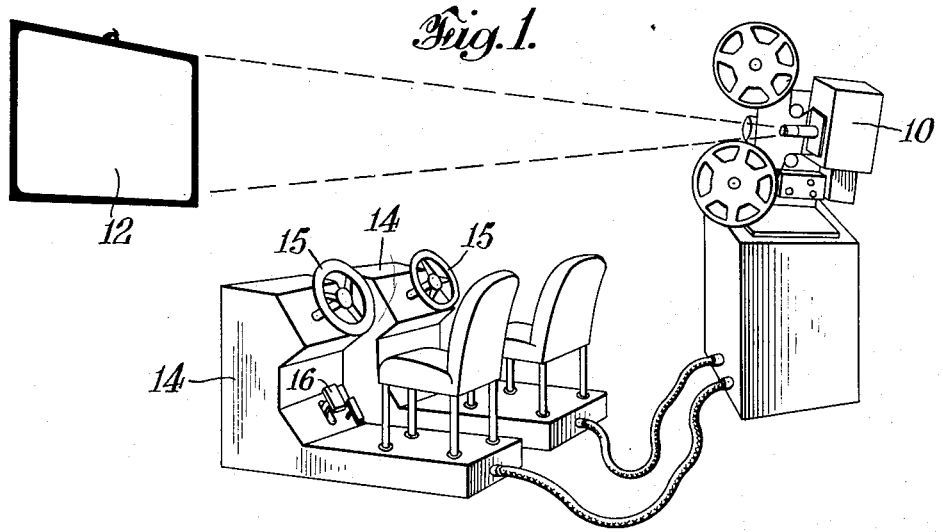
Figure 2:
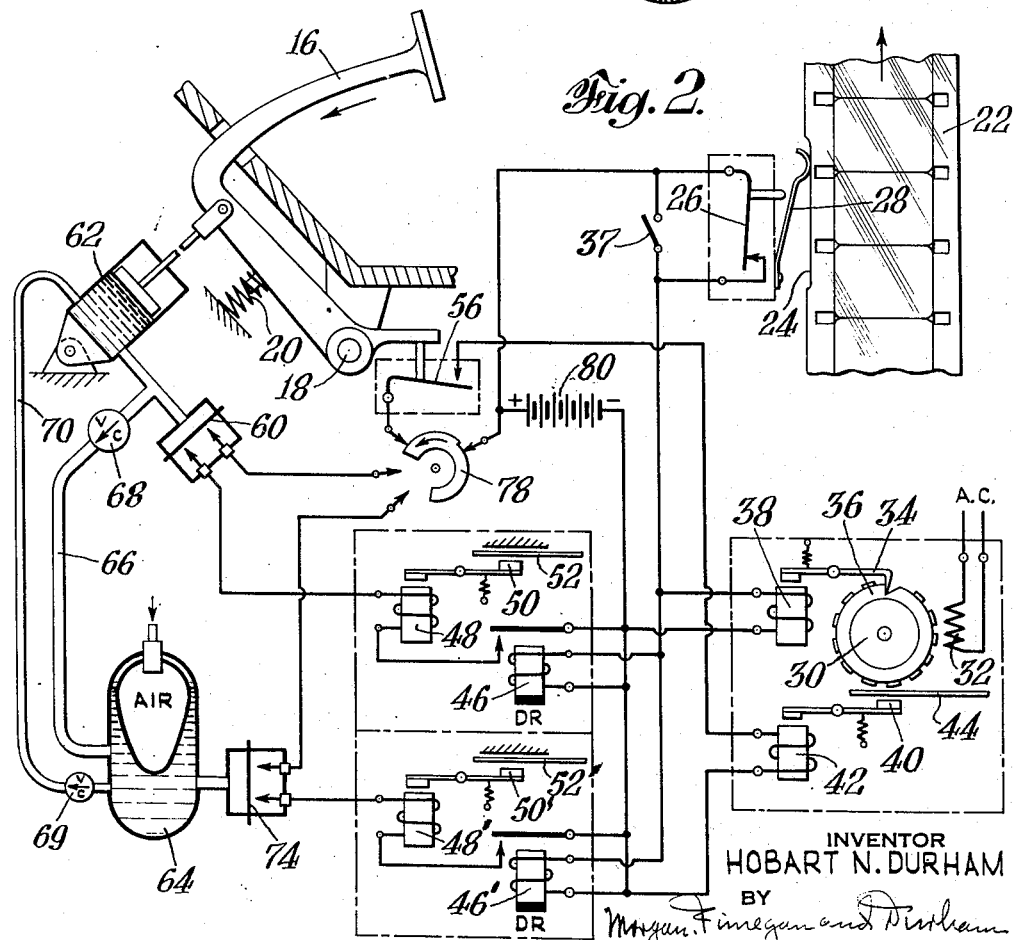

Of the drawings:

Figure 1 is a schematic view showing a typical and illustrative embodiment of driver training and testing apparatus embodying the present invention; and Figure 2 is a circuit diagram, with certain of the mechanical parts schematically shown, of the preferred and illustrative embodiment of the present invention.

The present invention has for its object the provision of a novel and improved recording or registering apparatus, especially useful in the training and testing of drivers, for differentiating between several different manners in which a single control member may be operated by the person being trained or tested. A further object is the provision of a novel and improved driver testing device which will produce a record of the operation of a control member in accordance with several different manners of operation of the control member, thereby showing whether the control member was operated or not and the reaction time involved in its operation, whether the control member was actuated suddenly or gradually, and whether the control member was repeately actuated, for instance, as is necessary for the proper operation of a brake pedal in stopping an automobile on icy or slippery surfaces.

In general, the present invention is an improvement on the driver testing apparatus shown and described in the prior patent to Durham and Finnegan, No. 2,269,444 granted January 13, 1942, although in many respects the present invention is of more general application.

In accordance with the present invention, there is provided a means for presenting to the person being tested a stimulus which calls for a particular one of several alternative responses on the part of the person being tested or trained, and other means are provided for indicating and preferably making a printed record of the response which was made by the person.

Illustratively, the person being tested or trained is positioned so that he may view a motion picture of a road scene projected on a screen in front of him, the motion picture presenting to him various scenes which call for various responses which are properly expressed by his operation of one or more control members in a particular manner. Thus, as the person being tested or trained views the motion picture he sees a road scene, and as he apparently travels down the road incidents are shown in the motion picture which call for operation of a brake pedal which would slow or stop the vehicle under his control. A sudden emergency may be depicted by the motion picture which requires a sudden application of the vehicle brakes with their maximum force and in that case it may be desired to record the time required for the application of the brakes, as well as whether the brakes were applied with more than a predetermined pressure so as to record the individual's reaction time under such conditions, or alternatively it may be desired to ascertain whether or not the brake pedal was properly actuated, as by rapidly repeated, moderate applications as would be necessary in slowing or stopping on slippery, icy surfaces, and if desired, whether the brake was applied with too great pressure under such conditions. Thus a driver may be intensively trained under entirely safe conditions so that the proper actuation of the control members becomes a matter of habit with conditioned reflexes and he is much better prepared to cope with such emergencies when they actually arise on the road.

Referring now in detail to the present preferred and illustrative embodiment of the invention as shown in the accompanying drawings, Figure 1 shows in general a typical form of apparatus especially suited for the training or testing of a plurality of individuals. As embodied, there is provided a motion picture projector 10 which projects an image of a road scene on the projection screen 12 which can be viewed by the individuals seated at the several control desks 14.

The motion picture is usually one which shows the changing scene as a vehicle moves over the road at a constant or variable speed with various incidents being shown during the course of travel of the vehicle. Thus, as the scene progresses, opposing traffic may be shown, road obstructions may be encountered which require proper operation of the steering wheel 15, a vehicle may suddenly appear at a cross road which required operation of the brake 16 for sudden stopping of the (simulated) controlled vehicle, and as this braking operation is required by the stimulus-creating scene it may be shown as occurring on dry paving or on wet or icy paving which requires a different manner of operation of the brake 16 than the normally dry paving. Alternatively, conditions may be such as to require the operation of the brake 16 by a moderate sustained application of pressure as distinguished from a sudden application of the brake, and even as a response to the braking stimulus for icy conditions, it may be desired to differentiate between proper moderate applications of the brake and sudden forceful application of the brake which would lock the vehicle wheels and tend to cause the vehicle to skid.

Preferably, a permanent or printed record is made of the manner in which the brake was operated so that the various persons being tested or trained may have a record of their performance for comparison with the performance at other times. This permanent or printed record also relieves the instructor or examiner of the necessity of continually watching and making a proper record of the manner in which several controls are simultaneously operated by each of several different individuals being tested or trained.

The brake pedal 16, shown as the illustrative control member, is of conventional automotive construction and is mounted in a normal position so that it may be actuated by the person being tested, being pivoted at 18 and normally returned to its idle position, as by spring 20.

Means are provided for conditioning the brake member 16 so that its operation by the person in response to the stimulus presented by the motion picture will result in actuation of the printing or recording mechanism and these means are preferably conditioned and controlled in timed relation to the motion picture film, and preferably from the film itself, while other means are provided by which a selected one or more of the printing or recording means is rendered operable for a given stimulus. As embodied, the motion picture film is schematically shown at 22 and is adapted to be fed through the motion picture projector 10 as its images are successively projected onto the screen 12. On the film itself are carried the actuating means for the brake conditioning means, and while various types of actuating means may be used, they are illustratively shown as comprising a notch 24 in the edge of the film 22, the film edge normally holding the electric switch 26 in open circuit position against the pressure of a light spring 28. At the moment when the scene on screen 12 begins to show the stimulus requiring brake operation, switch 26 is closed by movement of the film 22, thereby conditioning an electric circuit in the apparatus so that on subsequent energization by actuation of a manual control or alternatively by the operation of a second film notch 24, the recording means will be operated to show whether or not the manual control was operated, or the manner in which the control was actuated, or the time required after the stimulus for the operation of the manual control.

Illustratively, the manual control, such as the brake pedal 16 is so correlated with the registering or recording means that the time required for the operation of the brake pedal after the person being tested observed the stimulus requiring brake operation is measured and registered or recorded, a record is also made of whether or not the person operated the brake pedal with sufficient pressure to stop the vehicle, or alternatively with excessive pressure so as to correspond to an abnormally abrupt stop, a further record may be made of whether or not the person operated the brake pedal in a particular manner as might be required as for instance for the braking of the vehicle on an icy or extremely slippery paving, or when desired, for combinations of these manners of operation, so that an accurate record may be made of the manner in which the control member was operated in response to any particular stimulus and in response to successive and different stimuli.

For measuring the reaction time, a self-starting synchronous motor rotor 30, acting as a torque motor, and constantly energized by the field produced by the field coil 32 is held against rotation by means of a pivoted detent 34 normally engaging with a cut-away portion of a ring 36 secured to the rotor 30, pivoted detent 34 being released to allow rotation of the motor rotor 30 by means of the coil 38. Ring 36 carries on its periphery printing indicia which may be inked and may be printed by means of the printing impression member 40 which is actuated by means of the electromagnet 42 to make a printed impression on the record sheet 44. Such a record, depending on the indicia on the surface of the ring 36 may show the time in fractions of a second, or show whether or not a particular predetermined time was exceeded.

Two other registering or recording means are provided which are illustratively shown as being of similar construction, each being adapted to be conditioned for operation by closure of the switch 26 and adapted to register or record proper or improper operation of the brake mechanism as it is actuated subsequent to the passage of the film notch 24 past the switch 26. As embodied, as delayed release relay 46, which remains closed a predetermined time, such as two or three seconds, is adapted to be energized and conditioned by means of a first impulse transmitted to it from the switch 26 thereby conditioning the circuit so that actuation of the brake pedal in a particular manner within the delay period of two or three seconds will cause coil 48 to be energized and thereby actuate the registering or recording means 50, for instance so as to print on the sheet 52.

For actuating the reaction timing and recording means from the brake pedal, the brake pedal is provided with a simple switch 56 adapted to be closed as the brake pedal 16 is depressed.

In order to determine whether the brake pedal 16 is depressed with sufficient force, or alternatively with excessive force, pressure measuring means are provided adapted to close a switch 60 on application of the brake with a force in excess of a predetermined limit. As embodied, the brake pedal is connected to actuate a hydraulic or other fluid pressure means such as a pump 62 which is connected so that pressure on the liquid within the pump 62 is transferred to a pressure actuated switch 60 having stationary and resiliently mounted contacts to be brought into circuit closing position whenever the liquid pressure exceeds a predetermined amount.

The means for determining whether or not the brake is repeatedly actuated, as would be necessary for slowing or stopping on slippery paving comprises a closed pressure reservoir 64 to which liquid is adapted to be pumped from the pump 62 through a relatively large supply pipe 66 in which is located a check-valve 68 to prevent flow of liquid through pipe 66 from the reservoir 64 to the pump 62. The upper portion of the reservoir 64 is filled with air while the liquid is supplied to it and fed from it by the pipes 66 and 70 which are connected to the lower portion of the reservoir 64. A return capillary 70 allows the liquid pumped from the pump 62 to the reservoir 64 to be gradually returned to the pump 62 under the pressure exerted on the liquid by the air in the upper part of the reservoir 64. Pressure responsive means are also provided which are actuated whenever the pressure within the reservoir 64 exceeds a predetermined value, and for this purpose a pressure responsive switch 74 is connected to the reservoir 64, switch 74 being similar to the switch 60.

Relay 46' is closed upon the brake pedal 16 being depressed, and conditions the coil 48' of the recording means 50' to print on sheet 52' when the brake is depressed with sufficient force to close switch 74.

Selector means are provided which may be operated manually or otherwise and connect the several switches 56, 60 and 74, one at a time or in groups as desired to their respective recording or registering means, at all times putting the several switches actuated by operation of the control member in series with the film operated switch so that they are rendered effective only after the stimulus has been presented to the person being trained or tested as indicated by closure of the film operated switch. This selector means may comprise a multiple contact switch 78 connected in circuit with the power source 80, the film actuated switch 26 and selectively with the switches 56, 60 and 74 and their respective registering or recording means.

For simplicity, the film actuated switch 26 may be always in circuit with the detent releasing coil 38, and the relay coils 46, by closing shunting switch 37, in which case, the recording means are rendered operative by positioning of the selector switch 78, and the selector switch 78 is variably positioned from incident to incident as these incidents are presented to the person being tested for his response.

The invention in its broader aspects is not limited to the specific mechanism shown and described but departures may be made therefrom within the scope of the accompanying claims without departing from the principles of the invention and without sacrificing its chief advantages.

What is claimed is:

1. In a driver training and testing apparatus the combination of means for presenting a stimulus to the view of the subject, a brake control member, means responsive to the force with which the brake control is applied for indicating the amount of said force and means for measuring the elapsed time between the stimulus and the actuation of the brake control.

2. Apparatus as claimed in claim 1 in which means are provided for making separate graphic records of the pressure and elapsed time in accordance with the actuation of the brake control.

3. Apparatus according to claim 1 in which additional means are provided for determining whether the brake control is actuated several times in rapid succession.

4. Apparatus according to claim 3 in which means are provided for making separate graphic records of the pressure, elapsed time and repeated brake control operation in accordance with actuation of the brake control.

5. Apparatus according to claim 1 in which the stimulus is presented by a motion picture projector and the gauging means and elapsed time measuring means are conditioned for measuring by passage of the film through the projector.

6. Apparatus according to claim 5 in which means are provided for making separate graphic records of the pressure, elapsed time and repeated brake control operation in accordance with actuation of the brake control.

7. In a driver training and testing apparatus, the combination of means for presenting a stimulus to the view of the subject, a brake control member, means for measuring the elapsed time between the stimulus and the actuation of the brake control other means actuated only on repeated operations of the brake control in rapid succession, and means for separately indicating the elapsed time of brake operation and whether the brake control was successively and rapidly operated.

8. Apparatus according to claim 7 in which means are provided for making separate graphic records of the pressure, elapsed time and repeated brake control operation in accordance with actuation of the brake control.

HOBART N. DURHAM.

References Cited in the file of this patent

UNITED STATES PATENTS

| Number | Name | Date |
|---|---|---|
| 1,564,138 | Rowland | Dec. 1, 1925 |
| 2,088,264 | Heinis | July 27, 1937 |
| 2,177,501 | Smalley | Oct. 24, 1939 |
| 2,260,432 | Brown | Oct. 28, 1941 |
| 2,269,444 | Durham | Jan. 13, 1942 |
| 2,273,091 | De Silva | Feb. 17, 1942 |